United States Patent
Rosenberger et al.

(10) Patent No.: US 12,215,048 B2
(45) Date of Patent: Feb. 4, 2025

(54) METHODS FOR PRODUCING A HOLLOW-CORE FIBER AND FOR PRODUCING A PREFORM FOR A HOLLOW-CORE FIBER

(71) Applicant: HERAEUS QUARZGLAS GMBH & CO. KG, Hanau (DE)

(72) Inventors: Manuel Rosenberger, Hanau (DE); Michael Hünermann, Hanau (DE); Martin Trommer, Hanau (DE); Kay Schuster, Hanau (DE); Steffen Weimann, Hanau (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 423 days.

(21) Appl. No.: 17/625,175

(22) PCT Filed: Jul. 15, 2020

(86) PCT No.: PCT/EP2020/070004
§ 371 (c)(1),
(2) Date: Jan. 6, 2022

(87) PCT Pub. No.: WO2021/009231
PCT Pub. Date: Jan. 21, 2021

(65) Prior Publication Data
US 2022/0267193 A1    Aug. 25, 2022

(30) Foreign Application Priority Data
Jul. 17, 2019 (EP) ..................... 19186863

(51) Int. Cl.
*C03B 37/027* (2006.01)
*G02B 6/032* (2006.01)

(52) U.S. Cl.
CPC ........ *C03B 37/02781* (2013.01); *G02B 6/032* (2013.01); *C03B 2203/16* (2013.01)

(58) Field of Classification Search
CPC ....... C03B 37/012; C03B 37/02; C03B 37/01; G02B 6/03
See application file for complete search history.

(56) References Cited

U.S. PATENT DOCUMENTS 3,950,073 A * 4/1976 Horiguchi ................ G02B 6/04
                                                              385/125
5,372,625 A * 12/1994 Brehm ................. G02B 6/4489
                                                               65/410

(Continued)

FOREIGN PATENT DOCUMENTS

| CN | 1849270 A | 10/2006 |
| CN | 108919417 A | 11/2018 |

(Continued)

OTHER PUBLICATIONS

Partial English Summary of Office Action issued Mar. 12, 2023 in CN Application No. 202080043629.8.

(Continued)

*Primary Examiner* — Alison L Hindenlang
*Assistant Examiner* — Steven S Lee
(74) *Attorney, Agent, or Firm* — Panitch Schwarze Belisario & Nadel LLP (57) ABSTRACT

Methods are known for producing an anti-resonant hollow-core fiber which has a hollow core extending along a fiber longitudinal axis and an inner jacket region that surrounds the hollow core, said jacket region comprising multiple anti-resonant elements. The known methods have the steps of: providing a cladding tube that has a cladding tube inner bore and a cladding tube longitudinal axis along which a cladding tube wall extends that is delimited by an interior (Continued)

and an exterior; providing a number of tubular anti-resonant element preforms; arranging the anti-resonant element preforms at target positions of the interior of the cladding tube wall, thereby forming a primary preform which has a hollow core region and an inner jacket region; and elongating the primary preform in order to form the hollow-core fiber or further processing the primary preform in order to form a secondary preform. The aim of the invention is to achieve a high degree of precision and an exact positioning of the anti-resonant elements in a sufficiently stable and reproducible manner on the basis of the aforementioned methods. This is achieved in that while carrying out a process according to step (c), components of the primary preform made of quartz glass and/or parts surrounding the primary preform made of quartz glass are heated and softened together, wherein the quartz glass of at least one of the preform components and/or the quartz glass of at least one of the parts surrounding the preform contains at least one dopant which decreases or increases the viscosity of quartz glass.

14 Claims, 1 Drawing Sheet

(56) References Cited

U.S. PATENT DOCUMENTS

| | | | |
|---|---|---|---|
| 2003/0172682 A1 | 9/2003 | Sato et al. | |
| 2003/0230118 A1 | 12/2003 | Dawes et al. | |
| 2003/0231846 A1* | 12/2003 | Fajardo | G02B 6/02328 65/393 |
| 2004/0028362 A1* | 2/2004 | Otosaka | C03B 37/01446 385/123 |
| 2004/0096173 A1 | 5/2004 | Fekety et al. | |
| 2005/0226578 A1 | 10/2005 | Mangan et al. | |
| 2006/0046075 A1 | 3/2006 | Maul et al. | |
| 2006/0088262 A1* | 4/2006 | Berkey | C03B 37/01234 385/125 |
| 2006/0130528 A1 | 6/2006 | Nelson et al. | |
| 2006/0204189 A1 | 9/2006 | Sasaki et al. | |
| 2008/0310806 A1 | 12/2008 | Mukasa | |
| 2009/0019893 A1 | 1/2009 | Bogdahn | |
| 2009/0052853 A1* | 2/2009 | Mukasa | G02B 6/02361 264/1.24 |
| 2012/0141078 A1* | 6/2012 | Mukasa | G02B 6/0281 385/124 |
| 2016/0236964 A1* | 8/2016 | Fokoua | C03B 37/02781 |
| 2016/0299289 A1* | 10/2016 | Bookbinder | C03C 3/06 |
| 2017/0075147 A1 | 3/2017 | Gutsche et al. | |
| 2017/0160467 A1* | 6/2017 | Poletti | G02B 6/02328 |
| 2018/0267235 A1* | 9/2018 | Russell | C03B 37/02781 |
| 2019/0011634 A1* | 1/2019 | Lyngsøe | C03B 37/0122 |
| 2022/0357506 A1* | 11/2022 | Rosenberger | C03B 37/01262 |

FOREIGN PATENT DOCUMENTS

| | | | | |
|---|---|---|---|---|
| DE | 102004054392 A1 | | 3/2006 | |
| DE | 102005028219 B3 | | 10/2006 | |
| DE | 102014224964 A1 | | 11/2015 | |
| DE | 102014011041 A1 | | 1/2016 | |
| DE | 102011014915 B4 | * | 1/2019 | C03B 37/01205 |
| EP | 3136143 A1 | | 3/2017 | |
| GB | 2566466 A | | 3/2019 | |
| JP | 2018150184 A | * | 9/2018 | |
| JP | 2019034865 A | * | 3/2019 | |
| WO | 02/072489 A2 | | 9/2002 | |
| WO | 2018/169487 A1 | | 9/2018 | |
| WO | 2019/008352 A1 | | 1/2019 | |

OTHER PUBLICATIONS

International Search Report and Written Opinion mailed Sep. 16, 2020 by the European Patent Office in its capacity as International Searching Authority for counterpart international patent application No. PCT/EP2020/070004 (with English translations attached).

Jasion, Gregory T et al., "Fabrication of tubular anti-resonant hollow core fibers: modelling, draw dynamics and process optimization" Optics Express vol. 27, No. 15, pp. 20567-20582, Jul. 2019 (DOI: 10.1364/OE.27.020567).

Kosolapov, A.F. et al., "Hollow-core revolver fibre with a double-capillary reflective cladding" Quantum Electronics 46 (3) Mar. 29, 2016 pp. 267-270 (DOI: 10.1070/QEL15972).

Nawazuddin, M.B.S. et al., "Lotus Shaped Negative Curvature Hollow Core Fibre with 10.5 dB/km at 1550 nm Wavelength" 2017 European Conference on Optical Communication (ECOC), IEEE, (2017) pp. 1-3 (DOI: 10.1109/ECOC.2017.8346101).

Poletti, Francesco "Nested antiresonant nodeless hollow core fiber," Optics Express, vol. 22, No. 20 (2014) pp. 23807-23828 (DOI:10.1364/OE 22.023807).

Sherlock, Ben et al., "Tunable fibre-coupled multiphoton microscopy with a negative curvature fibre" Journal of Biophotonics, vol. 9, No. 7, pp. 715-720, (2016) (DOI: 10.1002/jbio.201500290).

Yu, Fei, "Chapter 4—Fabrication of hollow core negative curvature fibre" in "Hollow core negative curvature fibres" University of Bath PhD. pp. 59-74, Dec. 31, 2013 (XP055656461).

* cited by examiner

METHODS FOR PRODUCING A HOLLOW-CORE FIBER AND FOR PRODUCING A PREFORM FOR A HOLLOW-CORE FIBER

TECHNICAL BACKGROUND

The invention relates to a method for producing an anti-resonant hollow-core fiber comprising a hollow core extending along a longitudinal axis of the fiber and a sheath region surrounding the hollow core, which sheath region comprises a number of anti-resonance elements, comprising the method steps of:
(a) providing a primary preform for the hollow-core fiber which comprises at least one cladding tube having an inner bore of the cladding tube and a longitudinal axis of the cladding tube along which a cladding tube wall delimited by an inner side and an outer side extends,
(b) forming a number of precursors or preforms for anti-resonance elements at desired positions of the cladding tube wall, and
(c) elongating the primary preform to form the hollow-core fiber or further processing the primary preform to form a secondary preform from which the hollow-core fiber is drawn, wherein the further processing comprises a single or repeated performance of one or more of the following hot-forming processes:
(i) elongation,
(ii) collapse,
(iii) collapse and simultaneous elongation,
(iv) collapse of additional sheath material,
(v) collapse of additional sheath material and subsequent elongation,
(vi) collapse of additional sheath material and simultaneous elongation.

The invention also relates to a method for producing a preform for an anti-resonant hollow-core fiber comprising a hollow core extending along a longitudinal axis of the fiber and a sheath region surrounding the hollow core, which sheath region comprises several anti-resonance elements, comprising the method steps of:
(a) providing a primary preform for the hollow-core fiber which comprises at least one cladding tube having an inner bore of the cladding tube and a longitudinal axis of the cladding tube along which a cladding tube wall delimited by an inner side and an outer side extends,
(b) forming a number of precursors or preforms for anti-resonance elements at desired positions on the cladding tube wall,
(c) further processing the primary preform to form a secondary preform for the hollow-core fiber, wherein the further processing comprises a single or repeated performance of one or more of the following hot-forming processes:
(i) elongation,
(ii) collapse,
(iii) collapse and simultaneous elongation,
(iv) collapse of additional sheath material,
(v) collapse of additional sheath material and subsequent elongation,
(vi) collapse of additional sheath material and simultaneous elongation.

Conventional single-mode optical fibers made of solid material have a core region made of glass, which is surrounded by a sheath region made of glass with a lower refractive index. Light guidance is based thereby on total reflection between the core region and the sheath region. However, the interactions of the guided light with the solid material are associated with an increased latency in data transmission and relatively low damage thresholds with respect to high-energy radiation.

These disadvantages are prevented or reduced by "hollow-core fibers" in which the core comprises an evacuated cavity filled with gas or liquid. In hollow-core fibers, the interaction of the light with the glass is less than in solid-core fibers. The refractive index of the core is less than that of the sheath so that light guidance by total reflection is not possible and the light would normally escape from the core into the sheath. As a function of the physical mechanism of the light guidance, hollow-core fibers are divided into "photonic bandgap fibers" and "anti-resonance reflection fibers."

In the case of "photonic bandgap fibers," the hollow core region is surrounded by a sheath in which small hollow channels are arranged periodically. On the basis of semiconductor technology, the periodic structure of the hollow channels in the sheath brings about the effect referred to as the "photonic bandgap," according to which light of certain wavelength ranges scattered at the sheath structures can constructively interfere due to Bragg reflection in the central cavity and cannot propagate transversely in the sheath.

In the embodiment of the hollow-core fiber referred to as "anti-resonant hollow-core fiber" (ARHCF), the hollow core region is surrounded by an inner sheath region in which so-called "anti-resonant elements" (or "anti-resonance elements," "AREs" for short) are arranged. The walls of the anti-resonance elements evenly distributed around the hollow core can act as Fabry-Perot cavities operated in anti-resonance, which reflect the incident light and guide it through the fiber core.

This fiber technology promises a low optical attenuation, a very broad transmission spectrum (even in the UV or IR wavelength ranges), and a low latency in data transmission.

Potential applications of the hollow-core fibers lie in the fields of data transmission, high-power beam guidance, for example for material processing, modal filtering, non-linear optics, in particular for super-continuum generation, from the ultraviolet to infrared wavelength range.

PRIOR ART

A disadvantage of anti-resonant hollow-core fibers is that higher-order modes are not necessarily suppressed so that they are often not exclusively single-mode over long transmission lengths and the quality of the output beam deteriorates.

In the paper by Francesco Poletti "Nested antiresonant nodeless hollow core fiber," Optics Express, vol. 22, no. 20 (2014), DOI: 10.1364/OE 22.023807, a fiber design is proposed, with which anti-resonance elements are not designed as a simple singular structural element but are composed of several nested structural elements. The nested anti-resonance elements are designed such that higher-order core modes, but not the fundamental core mode, are phase-matched to the sheath modes and are suppressed. As a result, the propagation of the fundamental core mode is always ensured, and the hollow-core fiber can be effectively single-mode over a limited wavelength range.

Effective mode suppression depends on the center wavelength of the transmitted light and on the structural parameters of the fiber design, such as the radius of the hollow core and the difference in the diameters of nested ring structures in the anti-resonance elements.

EP 3 136 143 A1 discloses an anti-resonant hollow-core fiber (referred to therein as "hollow-core fiber of nonbandgap type"), in which the core can conduct further modes in addition to the fundamental mode. For this purpose, it is surrounded by an inner sheath having "non-resonant elements," which provide a phase-matching of anti-resonant modes with the higher modes. The hollow-core fiber is produced according to what is known as a "stack-and-draw technique" by arranging the starting elements to form an axially parallel ensemble and fixing them to form a preform and then elongating the preform. In this case, a cladding tube with a hexagonal inner cross-section is used, and six so-called "ARE preforms" (anti-resonance element preforms) are fixed in the inner edges of the cladding tube. This preform is drawn in two stages to form a hollow-core fiber.

WO 2018/169487 A1 discloses a method for producing a preform for anti-resonant hollow-core fibers, in which a first sheath region comprises a plurality of rods and a second sheath region comprises a plurality of tubes surrounded by an outer cladding tube. Rods, tubes, and cladding tube are joined to form a preform by means of the "stack and draw" technique. Before the preform is elongated, the preform end is sealed, which is done by applying a sealing compound. For example, a UV adhesive is used as the sealing compound.

TECHNICAL OBJECT

Anti-resonant hollow-core fibers, and in particular those with nested structural elements, have complex internal geometries, which makes it difficult for them to be produced exactly and reproducibly. This applies all the more because, if the resonance or anti-resonance conditions are to be maintained, even small variations in dimensions in the order of magnitude of the operating wavelength of the light to be guided cannot be tolerated. Deviations from the desired geometry can be caused by the configuration of the fiber preform, and they can also occur through undesired deformations that are not true to scale in the fiber-drawing process.

In the known "stack and draw" technique, many elements are to be joined together with positional accuracy. For example, in order to produce the hollow-core fiber known from the aforementioned paper in the "NANF" design, six anti-resonance element preforms, each consisting of an anti-resonance element outer tube (ARE outer tube, for short) and an anti-resonance element inner tube welded on one side to the inner sheath surface of the ARE outer tube (ARE inner tube, for short) must be attached to the inner side of a cladding tube.

In order to achieve low attenuation values and broad transmission ranges, the azimuthal position of the anti-resonance elements within the cladding tube is also important in addition to a uniform wall thickness of the walls of the anti-resonance elements. This cannot be easily achieved with the "stack and draw" technique. The object of the invention is to specify a method for the cost-effective production of an anti-resonant hollow-core fiber that avoids the limitations of conventional production methods.

In particular, it is the object of the invention to provide a method for producing an anti-resonant hollow-core fiber and a preform for anti-resonant hollow-core fibers, with which a high precision of the structural elements and an exact positioning of the anti-resonance elements in the fiber can be reproducibly achieved in a sufficiently stable and reproducible manner.

Moreover, disadvantages of the classic "stack and draw" technique, with which the required structural accuracies, in particular a uniform wall thickness of the anti-resonance elements and exact positioning at predetermined azimuthal positions, is not easy to achieve, are to be avoided if at all possible.

SUMMARY OF THE INVENTION

With regard to the production of the anti-resonant hollow-core fiber, this object is achieved according to the invention starting from a method of the genus mentioned at the outset in that, when carrying out a process in accordance with method step (c), components of the primary preform made of quartz glass and/or components made of quartz glass surrounding the primary preform are heated and softened together, wherein the quartz glass of at least one of the preform components and/or the quartz glass of at least one of the components surrounding the preform contains at least one dopant that lowers or increases the viscosity of quartz glass.

Components of the preform include the cladding tube and anti-resonance element preforms arranged on the cladding-tube inner side, as well as any additional sheath material produced on the outer sheath surface of the cladding tube. The components surrounding the preform are, for example, one or more overlay cylinders, which surround the preform during the hot-forming process in order to be collapsed thereon in order to form additional sheath material. For the sake of simplicity, the components surrounding the preform are also subsumed below under the term "components" of the preform.

At least one of the preform constituents contains at least one dopant lowering the viscosity of quartz glass or increasing the viscosity of quartz glass. A type of doping decreasing the viscosity of quartz glass is also referred to in the following for short as "down-doping," and a type of doping increasing the viscosity of quartz glass is also referred to in the following for short as "up-doping." Dopants used to lower the viscosity of quartz glass are preferably fluorine, chlorine, and/or hydroxyl groups. $Al_2O_3$ and/or nitrogen come into consideration as dopants increasing the viscosity of quartz glass.

The starting point for producing the anti-resonant hollow-core fiber is a preform, which is also referred to herein as a "primary preform." It comprises a cladding tube in which or on which precursors or preforms for the shaping of anti-resonant elements in the hollow-core fibers are contained (referred to here as "anti-resonance elements" for short). The primary preform can be elongated to form the hollow-core fiber; however, as a rule, additional sheath material is added to the primary preform to produce therefrom a preform referred to herein as a "secondary preform." Optionally, the hollow-core fiber is produced by elongating the secondary preform. Alternatively, the primary preform or the secondary preform are surrounded by one or more overlay cylinders to form a coaxial ensemble of components, and the coaxial ensemble is elongated directly to form the hollow-core fiber. The general term "preform" is understood here to mean that component or that coaxial ensemble of components from which the hollow-core fiber is ultimately drawn.

The addition of sheath material is accomplished, for example, by collapsing an overlay cylinder onto the primary preform. The coaxial arrangement of primary preform and overlay cylinder is elongated or is not elongated when the overlay cylinder is collapsed. The anti-resonance element preforms here are changed in their shape or arrangement, or they are not changed in their shape or arrangement.

Carrying out one of the hot-forming processes mentioned in method step (c) (hereinafter also referred to as 'Thermal processing') can lead to deformation and structural deviation of the desired fiber geometry. This is in particular the case if both thick-walled and delicate preform components consisting of the same material lie close to one another or adjoin one another.

This is because the necessary processing temperature is usually determined by the component having the greatest surface area; this is typically the outer sheath region of the preform. Smaller components (such as the anti-resonance element preforms and their individual structural elements) are subject to greater deformation at the same temperature. Since, during thermal processing, the preform is heated in the heating zone from the outside to the inside, a radial temperature profile with a minimum in the preform center is established over the preform volume. This can intensify the aforementioned deformation problem if delicate components are arranged on a preform radius which is closer to the heating zone than a less delicate component, which is regularly the case in preforms for anti-resonant hollow-core fibers.

This problem is intended to be alleviated with the invention, and a higher accuracy of the geometric shape and of the positioning of the anti-resonance elements in the hollow-core fiber is thereby to be achieved. For this purpose, the quartz glass of at least one of the preform components contains at least one dopant that lowers or increases the viscosity of quartz glass.

The doping allows the viscosities of adjacent preform components to be adjusted. It can also be used in particular to reduce the thermal stability of a component in favor of the stability of an adjacent component. In particular, due to the down-doping of the preform component having the greatest surface area, the necessary processing temperature can be reduced, and the relative rigidity and thermal stability of constituents located further inward can thus be indirectly improved by exposing them to a lower temperature in the hot-forming process.

Ideally, a component in the outer sheath region of the preform is provided with a down-doping. This is in particular the outermost sheath of the preform. This enables the processing temperature to be lowered, as a result of which deformation during the hot-forming process can be reduced.

With a preferred procedure, it is thus provided that the optional further processing of the primary preform comprises the collapse of additional sheath material, and that the additional sheath material consists of quartz glass containing a dopant lowering the viscosity of quartz glass, wherein the dopant is preferably fluorine and is contained in a concentration of between 500 and 14,500 ppm by weight, preferably between 2000 and 10,000 ppm by weight.

A fluorine doping of the additional sheath material in this range makes it possible to lower the viscosity in comparison to the quartz glass of the cladding tube, even if the quartz glass of the cladding tube itself does not contain any dopant. It has proven to be advantageous for the quartz glass of the cladding tube at a measured temperature of 1250° C. to have a viscosity higher by at least 0.5 dPa·s, preferably a viscosity higher by at least 0.6 dPa·s, than the quartz glass of the additional sheath material. The viscosity differences are specified here and below as a logarithmic viscosity value in dPa·s.

In an advantageous procedure, all preform components of the preform consist of different quartz glass grades, wherein the viscosity of the components increases in a first approximation from the outside to the inside. Besides fluorine, other dopants, such as $Al_2O_3$, nitrogen, chlorine, and hydroxyl groups, can also be used for viscosity adjustment. $Al_2O_3$ has an effect of increasing viscosity in quartz glass up to a concentration of about 15 ppm by weight. In the simplest case, however, it is sufficient if only the additional sheath material contains a dopant and consists of quartz glass containing fluorine.

In a further preferred procedure, at least a portion of the precursors for anti-resonance elements is present as tubular anti-resonance element preforms, which are preferably composed of several nested structural elements, comprising an ARE outer tube and an ARE inner tube inserted therein, the anti-resonance element preforms consisting of quartz glass which, at a measured temperature of 1250° C., has a viscosity at least 0.4 dPa·s higher than the quartz glass of the cladding tube, preferably a viscosity at least 0.5 dPa·s higher.

The quartz glass of the ARE outer tube may contain a dopant that increases viscosity, such as $Al_2O_3$ or nitrogen. However, it has proven to be particularly advantageous if the cladding tube consists of quartz glass that contains a dopant that lowers the viscosity of quartz glass.

With regard to high thermal stability of the ARE inner tubes in the case of nested structural elements, it has proven effective if at least a portion of the ARE inner tubes, preferably all ARE inner tubes, consists of quartz glass which, at a measured temperature of 1250° C., has a viscosity at least 0.4 dPa·s higher than the quartz glass of the ARE outer tube, preferably a viscosity at least 0.5 dPa·s higher.

The cladding tube is preferably produced in a vertical drawing method without a molding tool with a two-stage elongation process. In the first stage, a starting hollow cylinder made of glass is mechanically processed in order to adjust the final dimensions of the starting hollow cylinder. In a first elongating process with a vertically oriented longitudinal axis, the starting cylinder is continuously supplied to a heating zone having a first heating zone length, softens therein in regions, and an intermediate cylinder is withdrawn from the softened region. In a second elongating process with a vertically oriented longitudinal axis, this intermediate cylinder is continuously supplied to another heating zone with a second, shorter heating zone length, softens therein in regions, and a tube section is withdrawn from the softened region. The cladding tube is obtained from the tube section by cutting it to length.

By using preform components having a low viscosity, in particular in the outer sheath region, the method according to the invention makes it possible to use comparatively large preforms for thermal processing.

In view thereof, a secondary preform is preferably formed which has an outer diameter in the range of 30 to 90 mm and/or a primary preform is formed which has an outer diameter in the range of 20 mm to 70 mm, preferably in the range of 30 to 70 mm.

The preform outer diameter in the range of 30 to 90 mm is large in comparison to the current prior art. Since the existing absolute geometry error is scaled down more strongly during fiber drawing as the outer diameter of the preform increases, a more precise production of the hollow-core fiber is also made possible in principle when a large preform is used. However, with diameters greater than 90 mm, temperature gradients form within the preform volume during the fiber-drawing process, which gradients can result in deviations in the wall thickness of the anti-resonance elements in the hollow-core fiber. In the case of preform outer diameters of less than 30 mm, no particular contribution results from scaling down the geometry error. Moreover, it is advantageous to form a large primary preform the outer diameter of which is in the range from 20 to 70 mm, preferably in the range from 30 to 70 mm. This is a comparatively large outer diameter. In the prior art, the outer diameters of the primary preforms are typically 4 to 6 mm.

In a preferred method variant, the formation of preforms for anti-resonance elements in accordance with method step (b) comprises arranging the anti-resonance element preforms at desired positions on the inner side of the cladding tube wall, wherein a positioning template is used for arranging, which positioning template has holding elements for positioning the anti-resonance element preforms at the desired positions.

The positioning template has, for example, a shaft projecting into the inner bore of the cladding tube, which shaft is provided with holding elements in the form of several holding arms pointing radially outward.

The structurally predetermined star-shaped arrangement of the holding elements facilitates the exact positioning of the anti-resonance element preforms in the respective desired positions and their fixing. In this case, the positioning template is preferably used exclusively in the region of the end faces of the cladding tube, preferably in the region of both cladding tube end faces.

The accuracy of positioning of the preforms on the inner face of the cladding tube is improved by producing the inner side of the cladding tube by machining, in particular by drilling, milling, grinding, honing, and/or polishing.

In a preferred procedure, the accuracy of the positioning of the preforms in the cladding tube is further improved in that tubular structural elements are provided, at least a portion of which has a wall thickness in the range of 0.2 and 2 mm, preferably a wall thickness in the range of 0.25 and 1 mm, and wherein a cladding tube with an outer diameter in the range of 90 and 250 mm, and preferably with an outer diameter in the range of 120 to 200 mm, is provided. These components each have a length of at least 1 m. They are relatively high-volume structural elements for forming anti-resonance elements. This simplifies handling. In addition, with a vertical arrangement of cladding tube and structural elements, the gravitational force supports the parallelity and vertical alignment of the longitudinal axes of the structural elements when the structural elements are each positioned and fixed at the desired position at their upper face end, for example and preferably using the sealing or bonding compound explained in detail above and, additionally or alternatively thereto, by means of the positioning template described in detail above.

With regard to the production of the preform for the hollow-core fiber, the aforementioned technical object is achieved according to the invention starting from a method of the aforementioned genus in that, when performing a process in accordance with method step (c), components of the primary preform made of quartz glass and/or components made of quartz glass surrounding the primary preform are heated and softened together, wherein the quartz glass of at least one of the preform components and/or the quartz glass of at least one of the components surrounding the preform contains at least one dopant that lowers the viscosity of quartz glass.

The preform is a starting point for the production of the anti-resonant hollow-core fiber. By elongating the preform, either the anti-resonant hollow-core fiber is drawn directly, or a semi-finished product is first produced from which the anti-resonant hollow-core fiber is subsequently drawn. The production of the preform comprises the formation of components of the primary preform from quartz glass containing a dopant lowering the viscosity of quartz glass. This allows the processing temperature to be lowered during the hot-forming process and enables the use of comparatively large preforms.

Measures for producing the preform are explained above in connection with the production of the hollow-core fiber, and these explanations are included herewith.

Definitions

Individual method steps and terms of the above description are additionally defined below. The definitions form part of the description of the invention. That which is expressed in the description is definitive in the event of a factual contradiction between one of the following definitions and the remaining description.

Anti-Resonance Elements

The anti-resonance elements may be simple or nested structural elements of the hollow-core fiber. They have at least two walls that, when viewed from the direction of the hollow core, have a negative curvature (convex) or do not have a curvature (planar, straight). They generally consist of a material that is transparent to the working light, for example glass, in particular doped or undoped $SiO_2$, a plastic, in particular a polymer, a composite material or crystalline material.

Anti-Resonance Element Preform/Anti-Resonance Element Precursor

What are referred to as anti-resonance element preforms are components or constituents of the preform that essentially become anti-resonance elements in the hollow-core fiber by simple elongation during the fiber-drawing process. Components or constituents of the preform that become anti-resonance element preforms only upon forming or that become anti-resonance elements directly are referred to as anti-resonance element precursors. The anti-resonance element preforms may be simple or nested components to which additional positioning aids can be fixed. They are originally present in the primary preform.

Nested anti-resonance element preforms form nested anti-resonance elements in the hollow-core fiber. They are composed of an outer tube and at least one further structural element that is arranged in the inner bore of the outer tube. The further structural element can be a further tube which abuts against the inner sheath surface of the outer tube. The outer tube is referred to as an "anti-resonance element outer tube" or an "ARE outer tube" for short, and the further tube is referred to as an "anti-resonance element inner tube" or an "ARE inner tube" for short, or also as a "nested ARE inner tube."

In the case of multi-nested anti-resonance element preforms, at least one further structural element, for example a third tube abutting against the inner sheath surface of the nested ARE inner tube, can be arranged in the inner bore of the nested ARE inner tube. Where there are multi-nested anti-resonance element preforms, in order to distinguish between the multiple tubes that are arranged within the ARE outer tube, a distinction can optionally be made between "outer nested ARE inner tube" and "inner nested ARE inner tube."

The term "cross-section" in conjunction with cylindrical anti-resonance element preforms and their cylindrical structural elements always refers to the cross-section perpendicular to the respective longitudinal axis of the cylinder, namely, unless otherwise indicated, the cross-section of the outer contour in tubular components (not the cross-section of the inner contour).

Further processing of the primary preform, in particular by hot-forming steps, can result in intermediate products, in which the original anti-resonance element preforms are present in a shape that has been modified in comparison to the original shape. The modified shape is also referred to herein as an anti-resonance element preform or as an anti-resonance element precursor.

Preform/Primary Preform/Secondary Preform/Core Preform (Cane)

The preform is the component from which the anti-resonant hollow-core fiber is drawn. It is a primary preform or a secondary preform produced by further processing of the primary preform. The primary preform can be present as an ensemble consisting of at least one cladding tube and preforms or precursors for anti-resonance elements that are loosely accommodated or firmly fixed therein. The further processing of the primary preform to form a secondary preform from which the hollow-core fiber is drawn can comprise a single or repeated performance of one or more of the following hot-forming processes:

(i) elongation,
(ii) collapse,
(iii) collapse and simultaneous elongation,
(iv) collapse of additional sheath material,
(v) collapse of additional sheath material and subsequent elongation,
(vi) collapse of additional sheath material and simultaneous elongation.

A preform obtained by collapsing and/or elongating a primary preform is referred to in the literature as a core preform (cane). Typically, it is overlaid with additional sheath material before or during drawing of the hollow-core fiber.

Elongating/Collapsing

During elongation, the primary preform is lengthened. The lengthening can take place without simultaneous collapse. Elongation can take place true to scale so that, for example, the shape and arrangement of components or constituents of the primary preform is reflected in the elongated end product. During elongation, however, the primary preform can also be drawn not true to scale and its geometry can be modified.

During collapse, an inner bore is narrowed or annular gaps between tubular components are closed or narrowed. Collapse is generally accompanied by elongation.

Hollow Core/Inner Sheath Region/Outer Sheath Region

The ensemble comprising at least one cladding tube and therein loosely accommodated or firmly fixed preforms or precursors for anti-resonance elements is also referred to herein as "primary preform." The primary preform comprises the hollow core and a sheath region. This sheath region is also referred to as an "inner sheath region" if there is also an "outer sheath region" that has been produced, for example, by collapsing onto the ensemble, and if a distinction is to be made between said sheath regions. The terms "inner sheath region" and "outer sheath region" are also used for the corresponding regions in the hollow-core fiber or in intermediate products obtained by further processing of the primary preform.

The designation "inner side of the tube" is also used as a synonym for "inner sheath surface of the tube" and the designation "outer side of the tube" is also used as a synonym for "outer sheath surface of the tube." The term "inner bore" in conjunction with a tube does not mean that the inner bore has been produced by a drilling process.

Machining

This refers to separating mechanical manufacturing methods for the separating processing of a workpiece, in particular turning, cutting, drilling, sawing, milling, and grinding. This machining creates a longitudinal structure extending in the direction of the longitudinal axis of the cladding tube, which serves as a positioning aid for the anti-resonance element preforms. The longitudinal structure is accessible from the inner side of the cladding tube; it can also extend through the entire cladding tube wall to the outer side.

Particle Size and Particle Size Distribution

Particle size and particle size distribution of the $SiO_2$ particles are characterized using the $D_{50}$ values. These values are taken from particle size distribution curves showing the cumulative volume of $SiO_2$ particles as a function of the particle size. The particle size distributions are often characterized on the basis of the respective $D_{10}$, $D_{50}$, and $D_{90}$ values. In this case, the $D_{10}$ value characterizes the particle size that is not achieved by 10% of the cumulative volume of the $SiO_2$ particles, and accordingly, the $D_{50}$ value and the $D_{90}$ value characterize the particle sizes that are not achieved by 50% and by 90%, respectively, of the cumulative volume of the $SiO_2$ particles. The particle size distribution is determined by scattered light and laser diffraction spectroscopy according to ISO 13320.

EXEMPLARY EMBODIMENT

The invention is explained in more detail below with reference to an exemplary embodiment and a drawing. The following are shown in detail in schematic representation.

In the production of the hollow-core fiber or the preform for the hollow-core fiber, a plurality of components is to be connected to one another. In addition, it can be helpful to seal existing gaps or channels of the preform when carrying out hot-forming processes. For bonding or sealing, a sealing or bonding compound based on $SiO_2$ and as disclosed in DE 10 2004 054 392 A1 is used. In this case, an aqueous slip containing amorphous $SiO_2$ particles having a particle size distribution characterized by a $D_{50}$ value of about 5 μm and by a $D_{90}$ value of about 23 μm is produced by wet milling quartz glass grain. Further amorphous $SiO_2$ grains with an average grain size of about 5 μm are mixed with the base slip. The slip used as a bonding compound has a solid content of 90%, which consists of at least 99.9 wt. % $SiO_2$.

Figure 1:
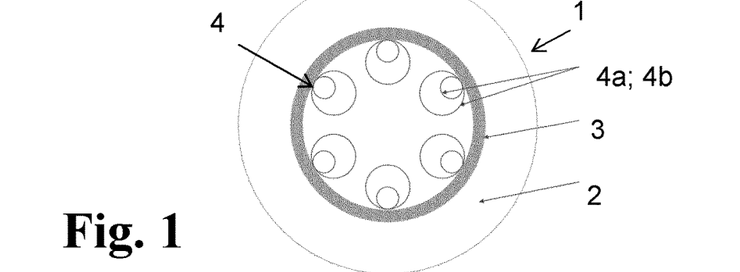
FIG. 1 a coaxial tube arrangement consisting of an overlay cylinder and a primary preform, which is composed of a cladding tube and anti-resonance element preforms positioned and fixed therein based on a view of the cross-section, FIG. 2 a diagram for the radial progression of the fluorine concentration and viscosity in the overlay cylinder and in the cladding tube, and FIG. 3 a sketch to explain an ideal radial concentration or viscosity profile of a preform for a hollow-core fiber.

FIG. 1 schematically shows the coaxial tube arrangement 1 with an overlay cylinder 2, a cladding tube 3 having a cladding tube wall, on the inner side of which are fixed, at a uniform distance, anti-resonance element preforms 4 at previously defined azimuthal positions; in the exemplary embodiment, there are six preforms 4; in another preferred embodiment (not shown), there is an odd number of preforms.

The cladding tube 3 has an outer diameter of 27 mm and an inner diameter of 20 mm. The anti-resonance element preforms 4 are present as an ensemble of nested structural elements consisting of an ARE outer tube 4a and an ARE inner tube 4b. The ARE outer tube 4a has an outer diameter of 6.2 mm and the ARE inner tube 4b has an outer diameter of 2.5 mm. The wall thickness of both structural elements (4a; 4b) is equal and is 0.3 mm. All tubular components 2, 3, 4a, 4b have a length of 700 mm.

The anti-resonance element preforms 4 are fixed to the inner wall of the cladding tube 3 by means of the bonding compound based on $SiO_2$. The bonding compound is applied locally to the inner sheath surface of the cladding tube in the region of the face ends, and the anti-resonance element preforms 4 are placed thereon using a positioning template with a structurally predetermined star-shaped arrangement of holding arms for the individual anti-resonance element preforms 4. In this case, the effect of the positioning template is limited to the region around the two face ends of the cladding tube. This method creates a precise and reproducible connection between the cladding tube 3 and the anti-resonance element preforms 4. Solidification of the bonding compound at a low temperature below 300° C. is sufficient for fixing so that an intense heating of the surrounding regions and thus a deformation of anti-resonance element preforms 4 is avoided.

The primary preform thus obtained is overlaid by the overlay cylinder 2 made of quartz glass. The overlay cylinder 2 has an outer diameter of 63.4 mm and a wall thickness of 17 mm. When the overlay cylinder 2 collapses onto the cladding tube 3, the coaxial tube arrangement is simultaneously elongated. For this purpose, the coaxial tube arrangement of the cladding tube 3 and the overlay cylinder 2 with a vertically oriented longitudinal axis is supplied from below to a temperature-controlled heating zone and softens therein zone by zone starting with the upper end of the tube arrangement. The heating zone is kept at a desired temperature of 1580° C. with a control accuracy of +/−0.1° C. Temperature fluctuations in the hot-forming process can thereby be limited to less than +/−0.5° C.

The secondary preform formed in the collapse and elongation process has an outer diameter of approximately 50 mm and a sheath wall thickness of 16.6 mm composed of an outer sheath and an inner sheath. It is subsequently drawn into the anti-resonant hollow-core fiber. All anti-resonance element preforms are sealed beforehand with the sealing or bonding compound. The sealing compound is applied only to the end face of the anti-resonance element preforms that points upward during the fiber-drawing process. This end face is connected to a holding tube made of quartz glass, which simultaneously serves as a gas connection. The holder is fixed to the overlay cylinder 2 and to the cladding tube 3 by means of the sealing or bonding compound.

In the fiber-drawing process, the secondary preform with a vertically oriented longitudinal axis is supplied from above to a temperature-controlled heating zone and softens therein zone by zone starting at the lower end. At the same time, gas is supplied to the core region (hollow core) so that an internal pressure of 4 mbar is adjusted in the core region. The heating zone is kept at a desired temperature of approximately 2080° C. with a control accuracy of +/−0.1° C. Temperature fluctuations in the hot-forming process can thereby be limited to less than +/−0.5° C.

By drawing the preform toward the hollow-core fiber, the existing absolute geometry error is scaled down so that in the hollow-core fiber, the anti-resonance elements obtained from the anti-resonance element preforms have a maximum deviation of less than 3.5% in the wall thickness (with respect to an average wall thickness).

The slight error in wall thickness is attributed, on the one hand, to the use of the comparatively large secondary preform and the accompanying scaling down of the original existing absolute geometry deviations and, on the other hand, to comparatively low processing temperatures during the hot-forming processes (elongating and collapsing, fiber drawing). The lower processing temperatures are in turn attributable to the fact that the overlay cylinder 2 and the cladding tube 3 consist of quartz glass doped with fluorine. In the coaxial arrangement 1, these components represent the components having the greatest surface area and were definitive in determining the processing temperature. As a result of the fluorine doping of the components having the greatest surface area of the secondary preform, the necessary processing temperature can be reduced, and the relative stiffness and thermal stability of the further inner anti-resonance element preforms 4 can thus be indirectly improved by exposing them to a lower temperature in the hot-forming process.

Table 1 below summarizes details of the materials of the components of the coaxial arrangement or of the secondary preform.

TABLE 1

| Reference number in FIG. 1 | Name/Function | Material |
|---|---|---|
| 2 | Overlay cylinder | Fluorine-doped quartz glass 10,000 ppm by weight |
| 3 | Cladding tube | Fluorine-doped quartz glass 2,700 ppm by weight |
| 4a | ARE outer tube | Undoped quartz glass |
| 4b | ARE inner tube | Undoped quartz glass |

The quartz glass tubes (2; 3) doped with fluorine have a fluorine concentration profile with a maximum of the fluorine concentration in the center of the tube wall. The data regarding the fluorine concentration of the quartz glass that are mentioned in the "Material" column of Table 1 are mean values.

Figure 2:
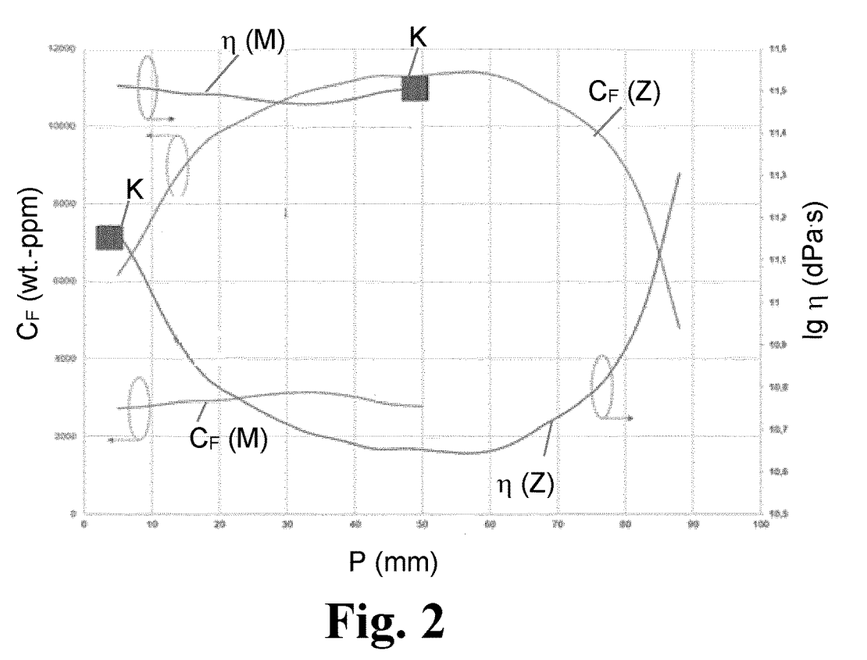

The diagram in FIG. 2 shows measured fluorine concentration profiles C (in ppm by weight) for a cladding tube $C_F(M)$ and in the case of an overlay cylinder $C_F(Z)$, as well as viscosity profiles η (in log dPa·s) along the radial coordinate (position P (in mm)) and calculated from the concentration profiles for a temperature of 1250° C.

The fluorine concentration curve in quartz glass is determined by infrared spectroscopy. The viscosity scales with the fluorine concentration for a given temperature and is calculated starting from a base value for undoped quartz glass (η=11.8 dPa·s (corresponding to 100%)) using the following formula:

Decrease in viscosity at 1250° C.: 12% (±2%) per wt. % fluorine.

Table 2 shows viscosity values for fluorine contents of commercially available quartz glass grades (for a measured temperature of 1250° C.).

TABLE 2

| Fluorine content [ppm by weight] | log η @ 1250° C. [dPa*s] |
|---|---|
| 0 | 11.80 |
| 4,800 | 11.00 |
| 10,000 | 10.50 |
| 13,000 | 9.80 |

The diagram in FIG. 2 shows that the viscosity of the overlay cylinder η(Z) is lower than that of the cladding tube η(M). In both quartz glass tubes, the viscosity at the center of the tube has a minimum, which is approximately $10^{11.45}$ dPa·s for the cladding tube and approximately $10^{10.65}$ dPa·s for the overlay cylinder. The difference in viscosity of the minima (in log dPa·s) is thus approximately 0.80 dPa·s. The difference between the viscosity of the cladding tube in the region of the cladding tube outer side (approximately $10^{11.5}$ dPa·s) and the viscosity minimum in the overlay cylinder is approximately 0.85 (in log dPa·s).

In the preform, the outer sheath surface of the cladding tube and the inner sheath surface of the overlay cylinder form a common contact surface. The locational position of the contact surface—transferred to the viscosity profiles—is indicated in the diagram by the two rectangles "K". The following values result at these positions for the viscosities of the overlay cylinder and the cladding tube:

| | | |
|---|---|---|
| Cladding tube: | approximately 11.5 | log(dPa · s) |
| Overlay cylinder: | approximately 11.15 | log(dPa · s) |

The viscosity difference in the region of the contact surface is thus approximately 0.35 (in log dPa·s).

The structural elements (4a; 4b) of the anti-resonance element preforms (4) consist of undoped quartz glass and have a viscosity of about $10^{11.8}$ dPa·s.

Figure 3:
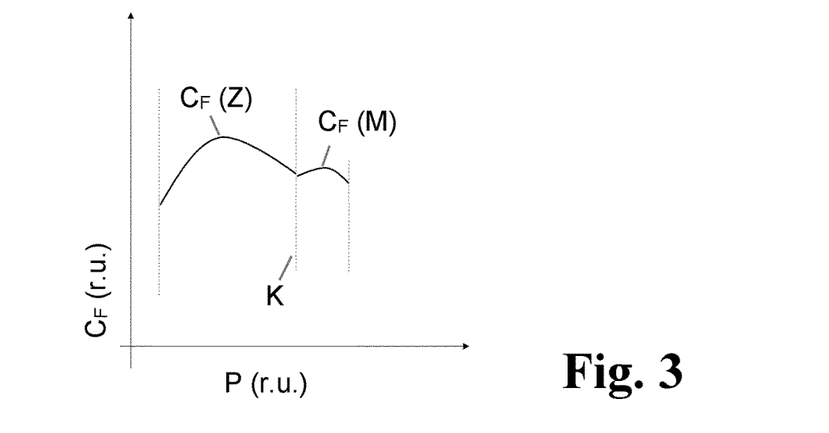

The diagram in FIG. 3 shows the radial dopant concentration curve over the wall of the secondary preform in idealized form. On the y-axis, the fluorine concentration $C_F$ (in relative unit) is plotted against the coordinate P (in relative unit). At the contact surface "K," the dopant concentration $C_F(Z)$ of the fluorine-doped quartz glass originating from the overlay cylinder is ideally as high as the concentration $C_F(M)$ of the fluorine-doped quartz glass originating from the cladding tube. The corresponding viscosity profile of the viscosities of the cladding tube and the overlay cylinder thus shows the same viscosity at the contact surface K on both sides.

The invention claimed is:

1. A method for producing an anti-resonant hollow-core fiber comprising a hollow core extending along a longitudinal axis of the fiber and an inner sheath region surrounding the hollow core, which sheath region comprises several anti-resonance elements (AREs), comprising the method steps of:
   (a) providing a primary preform for the hollow-core fiber which comprises at least one cladding tube having an inner bore of the cladding tube and a longitudinal axis of the cladding tube along which a cladding tube wall delimited by an inner side and an outer side extends,
   (b) forming a number of precursors or preforms for AREs at desired positions of the cladding tube wall, and
   (c) elongating the primary preform to form the hollow-core fiber or further processing the primary preform into a secondary preform from which the hollow-core fiber is drawn, wherein the further processing comprises a single or repeated performance of one or more of the following hot-forming processes:
   (i) elongation,
   (ii) collapse,
   (iii) collapse and simultaneous elongation,
   (iv) collapse of additional sheath material,
   (v) collapse of additional sheath material and subsequent elongation,
   (vi) collapse of additional sheath material and simultaneous elongation,
   wherein, when performing a process in accordance with method step (c), components of the primary preform made of quartz glass and/or components made of quartz glass surrounding the primary preform are heated and softened together, wherein the quartz glass of at least one of the preform components and/or the quartz glass of at least one of the components surrounding the preform contains at least one dopant that lowers or increases the viscosity of quartz glass, and
   wherein at least a portion of the precursors for AREs is present as tubular ARE preforms, which are composed of multiple nested structural elements, comprising an anti-resonance outer tube and an ARE inner tube inserted therein, and the ARE preforms include quartz glass which at a measured temperature of 1250° C. has a viscosity higher by at least 0.4 dPa·s than the quartz glass of the cladding tube.

2. The method according to claim 1, wherein the dopant lowering the viscosity of quartz glass comprises fluorine, chlorine, and/or hydroxyl groups, and the dopant increasing the viscosity comprises $Al_2O_3$ and/or nitrogen.

3. The method according to claim 1, wherein the optional further processing of the primary preform comprises collapsing additional sheath material, and the additional sheath material consists of quartz glass containing a dopant lowering the viscosity of quartz glass.

4. The method according to claim 3, wherein the quartz glass of the additional sheath material contains fluorine as dopant in a concentration between 500 and 14,500 ppm by weight.

5. The method according to claim 2, wherein, at a measured temperature of 1250° C., the quartz glass of the cladding tube has a viscosity higher by at least 0.5 dPa·s than the quartz glass of the additional sheath material.

6. The method according to claim 1, wherein only the additional sheath material contains the dopant and consists of quartz glass containing fluorine.

7. The method according to claim 1, wherein the cladding tube consists of quartz glass, which contains the dopant lowering the viscosity of quartz glass.

8. The method according to claim 1, wherein in the case of nested structural elements, at least a portion of the ARE inner tubes consists of quartz glass which at a measured temperature of 1250° C. has a viscosity higher by at least 0.4 dPa·s than the quartz glass of the ARE outer tube.

9. The method according to claim 1, wherein the cladding tube, the ARE outer tube, the ARE inner tube and/or an overlay cylinder for collapsing additional sheath material are produced on the basis of a vertical drawing process without a molding tool.

10. The method according to claim 1, wherein the secondary preform is formed which has an outer diameter in the range of 30 to 90 mm, and/or that the primary preform is formed which has an outer diameter in the range of 20 mm to 70 mm.

11. The method according to claim 1, wherein the formation of ARE preforms in accordance with method step (b) comprises arranging the ARE preforms at desired positions on the inner side of the cladding tube wall, wherein a positioning template that has holding elements for positioning the ARE preforms at the desired positions is used for arranging.

12. The method according to claim 11, wherein a positioning template is inserted with a shaft projecting into the inner bore of the cladding tube, which shaft is provided with holding elements in the form of several holding arms pointing radially outward.

13. The method according to claim 1, wherein the inner side of the cladding tube is produced by drilling, milling, grinding, honing, and/or polishing.

14. A method for producing a preform for an anti-resonant hollow-core fiber comprising a hollow core extending along a longitudinal axis of the fiber and an inner sheath region surrounding the hollow core, which sheath region comprises several anti-resonance elements (AREs), comprising the method steps of:
- (a) providing a primary preform for the hollow-core fiber which comprises at least one cladding tube having an inner bore of the cladding tube and a longitudinal axis of the cladding tube along which a cladding tube wall delimited by an inner side and an outer side extends,
- (b) forming a number of precursors or preforms for AREs at desired positions of the cladding tube wall, and
- (c) further processing the primary preform to form a secondary preform for the hollow-core fiber, wherein the further processing comprises a single or repeated performance of one or more of the following hot-forming processes:
- (i) elongation,
- (ii) collapse,
- (iii) collapse and simultaneous elongation,
- (iv) collapse of additional sheath material,
- (v) collapse of additional sheath material and subsequent elongation,
- (vi) collapse of additional sheath material and simultaneous elongation,
  wherein, when performing a process in accordance with method step (c), components of the primary preform made of quartz glass and/or components made of quartz glass surrounding the primary preform are heated and softened together, wherein the quartz glass of at least one of the preform components and/or the quartz glass of at least one of the components surrounding the preform contains at least one dopant that lowers or increases the viscosity of quartz glass, and
  wherein at least a portion of the precursors for AREs is present as tubular ARE preforms, which are composed of multiple nested structural elements, comprising an anti-resonance outer tube and an ARE inner tube inserted therein, and the ARE preforms include quartz glass which at a measured temperature of 1250° C. has a viscosity higher by at least 0.4 dPa·s than the quartz glass of the cladding tube.

* * * * *